United States Patent Office 3,050,509
Patented Aug. 21, 1962

3,050,509
PROCESS FOR DRYING COAGULATED CHLORO-BUTADIENE EMULSION POLYMERS
Anton Robert Heinz, Koln-Flittard, Dietrich Rosahl, Koln-Stammheim, Wilhelm Graulich, Dormagen, and Paul Esser, Leverkusen, Germany, assignors to Farbenfabriken Bayer Aktiengesellschaft, Leverkusen, Germany, a corporation of Germany
No Drawing. Filed Feb. 25, 1960, Ser. No. 10,840
Claims priority, application Germany Mar. 3, 1959
8 Claims. (Cl. 260—92.3)

The present invention relates to a process for drying coagulated chlorobutadiene emulsion polymers.

It has been found from experience that the drying of coagulated chlorobutadiene emulsion polymers (polychloroprene rubber) presents considerable difficulties, since these products, even in thin layers, have an extremely low steam permeability which makes the drying more difficult. The latices obtained by emulsion polymerisation of chlorobutadiene (chloroprene) have hitherto usually been so worked up that the latices were freeze-dried in thin layers, for example on rollers cooled to low temperature, the rubber strip thereby being formed was washed and squeezed and finally this strip was conveyed on an endless conveyor belt in numerous convolutions through a hot air drying chamber. Using this method, the rubber strip could only have maximum thickness of 0.2 to 0.5 mm. in order to assure reliable drying. It was consequently necessary to install apparatus of considerable dimensions in order to produce economic throughputs.

It is also known that other types of synthetic rubber, such as for example butadiene-acrylonitrile or butadiene-styrene copolymers, can in contrast be dried with substantially less trouble by subjecting the moist rubber coagulate to a kneading treatment in vacuo with simultaneous heating. During this kneading treatment, the dry portions of the rubber are remixed with the moist portions, so that new surfaces are constantly formed which are able to give off moisture. A suitable apparatus for carrying out this process is for example the worm drier developed by Welding Engineers, Incorporated, Norristown, Pa. (compare U.S. patent specification 2,458,-068.) The essential part of this apparatus is a suitable worm, preferably a double worm, through which the material to be dried is continuously conveyed and thoroughly kneaded. During the passage through the worm apparatus, the material to be dried passes through an evacuated chamber which is under a pressure of approximately 0.01 to 300 mm. Hg. The temperature of the apparatus is advantageously adjusted to about 110–200° C., the temperature to be used depending on the amount of throughput.

There seemed to be little prospect of drying polychloroprene rubber in such an apparatus, because at the temperatures at which the drying must be conducted in order to achieve economic throughputs, the rubber readily splits off hydrochloric acid and thereafter cross-links. Such products have no value whatsoever for further processing. Experience has shown that the tendency to cross-linking is also promoted by the kneading process. If the moist rubber which has been coagulated by the low temperature process, and has been washed and squeezed, is dried by the said process, a satisfactory rubber is in actual fact not obtained, but only a black cross-linked material.

It has now been found that coagulated chlorobutadiene emulsion polymers can be dried in a satisfactory manner when using this process if the chlorobutadiene emulsion polymers are coagulated by the process of co-pending patent application Serial Number 850,515, filed November 3, 1959. The coagulation of the latices is effected in this case by precipitation with aqueous solutions of mixtures of water soluble aluminium and/or titanium salts with such water soluble alkali metal and/or alkaline earth metal salts, the cations of which are not precipitated by the anions of said aluminium and titanium salts and the anions of which do not precipitate the cations of said aluminum and titanium salts. Suitable salts are, for instance, the sulphate, the nitrate, the chloride, the acetate of aluminium as well as ammonium and potassium aluminium sulphate; titanium sulphate which is used in an aqueous solution acidified by sulphuric acid; the chlorides, bromides, nitrates, sulphohydrates of calcium, strontium, barium; the chlorides, bromides, nitrates, sulphites of lithium, sodium, potassium, ammonium; these salts being so selected that they do not precipitate each other when combined in an aqueous solution. Among the combinations possible those of aluminium sulphate, calcium chloride and/or sodium chloride are of primary interest. The coagulating baths produced from said salts preferably have a pH value of 1.5 to 4.5. In case that this pH value is not obtained by the salts dissolved in the coagulating baths, it may be adjusted by means of acids such as sulphuric or hydrochloric acid. For carrying through the coagulation the salts (calculated as anhydrous salts) are preferably applied in the following percentages by weight as calculated on the weight of the latex to be coagulated:

(a) 0.05 to 5% of aluminium and/or titanium salt,
(b) 0.1 to 10% of earthen alkaline metal salt, and/or
(c) 5 to 100%, preferably 10 to 40%, of alkaline metal salt.

As regards the concentration of the coagulating baths it is preferred to use coagulating baths containing about 0.02 to 2% of aluminum and/or titanium salts, 5 to 40% of alkaline metal salts and/or about 0.04 to 4% of earthen alkaline metal salts. The temperatures of the coagulating bath may vary within about +5° C. and 70° C.

The process is of special importance for the coagulation of such synthetic polychloroprene rubbers which have a Defo value of about 100 to 2000, preferably 100 to 1000. (As to the definition of the Defo value compare "Kautschuk und Gummi," vol. 3 (1950), pages 195, 205, 245, 279, 323, 364 and DIN 53,514.) Polymers with such Defo values are obtained in known manner by carrying through the polymerisation of the respective monomers in aqueous emulsions in the presence of molecular weight regulators, such as higher alkyl mercaptans (n-dodecyl-mercaptan, tert. dodecylmercaptan). The latices are generally applied in concentrations varying between about 10 to 50% by weight as based on solid polymer. As regards the emulsifying agents present in the synthetic rubber latices, the present process is espectially valuable for such latices which contain water-soluble salts, such as sodium, potassium, ammonium salts of disproportionated abietic acid (sold under the tradename "Dresinate") as emulsifiers in amounts of about 0.5 to 5% by weight.

In addition, the presence of salts of polyvalent acids, such for example as buffering substances, in the aqueous emulsions to be coagulated has proved advantageous, it being immaterial whether these substantces are already present during polymerization or are only added before coagulation. Sodium pyrophosphate, primary, secondary or tertiary sodiumorthophosphate, sodium borate and sodium metaphosphate have, for example, proved suitable for this purpose, these substances being preferably applied in quantities of about 0.05 to 1% by weight as calculated on the weight of latex.

According to one modification of the coagulation of a polychloroprene latex, is effected by adjusting the pH value to about 5 to 7 (original pH value of the latex 7.5 to 12) after having added one of the above cited buffering agents, and adding the acid latex dropwise to, or running it into the stirred electrolyte solution so that the final mixture has a pH value of about 2 to 5. According to a further modification of the present invention, the latex having a pH value of 7.5 to 12, has added thereto the cited buffering agent and is thereafter added to the coagulating bath so as to obtain a final mixture having a pH value of about 6 to 7. The size and shape of the polymer particles formed can be largely influenced by suitable concentration of the salts, by the working temperature (+5° C. to 70° C.), and also the stirring and the supply speeds. The process can readily be carried out continuously.

According to the present invention the further processing to provide the dry polymer is thereafter carried out as follows:

The coagulate obtained in the form of crumbs is washed with water and is continuously fed through a shaker-type sieve and through a hopper to the worm or screw of the drying apparatus. The worm transports the material continuously into an evacuated chamber which is heated to a temperature of about 110 to 200° C. and in which the material remains for about 0.2 to 2 minutes, preferably less than 1 minute. The temperature and the vacuum are chosen to correspond to the quantity of moist rubber which is supplied, that is to say it is adapted to the throughput speed. On leaving the heated evacuated zone, the dry material normally only still contains 0.1 to 0.2% of moisture and is substantially transparent; it is thereafter conducted by the worm continuously through a chamber which is not evacuated and which can be cooled externally with water and finally extruded through a nozzle of suitable size. The discharging extruded length is then cut by means of a rotating knife into small pieces, which can be treated with talcum to reduce the surface tackiness. The process is not only suitable for drying homopolymers, but also copolymers of chloroprene.

EXAMPLE 1

A solution of 3.6 kg. of $Al_2(SO_4)_3 \cdot 18H_2O$ in 70 litres of water is added to 300 litres of saturated common salt solution and thereafter 200 kg. of a 35% polychloroprene latex of the pH value 11.0 are run in over a period of from 2 to 3 hours while stirring. The result is a precipitate of stable particles which do not stick to one another. The product is washed free from salt and centrifuged.

The latex introduced can for example be produced according to Example 1 of French Patent 1,219,731. Prior to the coagulation thereof, a total of 0.5 kg. of $Na_4P_2O_7$ is added thereto. The coagulate is dried in a drier fitted with a double worm and under a vacuum of 10 mm. Hg. The properties of the products thereby being formed (product A at an outside temperature of 170° C. and product B at an outside temperature of 150° C.) are indicated in Table 1; the comparison material was prepared from the same latex by freeze-coagulation and drying at 90° C. in a circulating air drying chamber.

EXAMPLE 2

A mixture of 670 litres of 12% sodium chloride solution and 48 litres of a 5% $Al_2(SO_4)_3 \cdot 18H_2O$ solution is used as electrolyte. 200 kg. of a polychloroprene latex prepared according to Example 7 of French Patent 1,219,731 and having a pH value of 11.2, the latex having been stirred with 12 litres of a 5% $Na_4P_2O_7$ solution, are coagulated. A solid material is obtained in the form of completely stable crumbs, which are washed out with water. The coagulate is dried at 7 mm. Hg in a worm drier with an outside temperature of 160° C. (product C) and 145° C. (product D). The comparison material was obtained from the same initial latex. A survey of the properties of the products is given in Table 2.

As to nearer details regarding the worm drier reference is made to the description preceding the examples.

Table 1

|  | A | B | Comparison |
|---|---|---|---|
| Colour | light | light | light. |
| Water content (percent) | 0.1 | 0.1 | 0.25. |
| Crude Defo value [1] | 270/12 | 270/11 | 250/11. |
| Storability | very good | very good | very good. |
| HCl split off (min./120° C.) | 45 | 40 | 50. |
| Strength (kg./cm.²) | 141 | 145 | 143. |
| Modulus (330%/500%) | 31/100 | 32/99 | 31/98. |

[1] A plasticity standard.

Table 2

|  | C | D | Comparison |
|---|---|---|---|
| Colour | light | light | light. |
| Water content, percent | 0.1 | 0.1 | 0.2. |
| Crude Defo value | 850/26 | 870/27 | 800/26. |
| Storability | very good | very good | very good. |
| HCl split off (min./120° C.) | 55 | 50 | 65. |
| Solubility (benzene) | completely soluble. | completely soluble. | completely soluble. |

What we claim is:

1. A process for isolating polychloroprene from a polychloroprene latex and drying the isolated polychloroprene which comprises coagulating said aqueous polychloroprene emulsion to produce a finely divided coagulated polychloroprene, coagulation being affected by adding the emulsion to an aqueous salt solution comprising 0.05–5% of salts selected from the group consisting of water-soluble aluminum and titanium salts, together with a member selected from the group consisting of 0.1–10% of a water-soluble alkaline earth metal salt and 5–100% of a water-soluble alkali metal salt, said percentages being based on the weight of the polychloroprene emulsion to be coagulated, separating said coagulated polychloroprene from the coagulation medium, washing said coagulated polychloroprene and thereafter subjecting said coagulated polychloroprene for a time of not more than about 2 minutes to a continuous kneading process by means of a worm at a reduced pressure not greater than about 300 mm. Hg and at a temperature of at least about 110° C. to obtain a substantially dry polychloroprene.

2. A process according to claim 1 wherein the kneading is carried out at a temperature of about 110°–200° C.

3. A process according to claim 1 wherein said kneading process is restricted to a time of about 0.2–2 minutes.

4. A process for isolating polychloroprene from aqueous polychloroprene emulsions and drying the isolated polychloroprene which comprises coagulating said aqueous polychloroprene emulsion by adding it to an aqueous salt solution comprising 0.05–5% of salts selected from the group consisting of water-soluble aluminum and titanium salts, together with a member selected from the group consisting of 0.1–10% of a water-soluble alkaline earth metal salt and 5–100% of a water-soluble alkali metal salt, the cations of which are not precipitated by the anions of the aluminum and titanium salts, and the anions of which do not precipitate the cations of said aluminum and titanium salts, said percentages being based on the weight of the polychloroprene emulsion to be coagulated, said salt solution having a pH value of about 1.5–4.5 and containing said salts in concentrations of about 0.02–2% of said aluminum and titanium salts, of about 5–40% of said alkali metal salts and of about 0.04–4% of said earthen alkaline metal salts, to produce a finely divided polychloroprene coagulate, separating said coagulate from the coagulation medium, washing said coagulate and thereafter subjecting said coagulate for a time of not more than 2 minutes to a continuous kneading process by means of a worm at a reduced pressure of not over 300 mm. Hg and at a temperature of 110°–200° C. to obtain a substantially dry polychloroprene.

5. A process according to claim 4 wherein said aqueous polychloroprene emulsion contains about 0.5–5% of a water-soluble salt of disproportionated abietic acid.

6. A process according to claim 4 wherein said equeous polychloroprene emulsion contains about 0.05–1% of a buffering substance selected from the group consisting of water-soluble phosphates and borates.

7. A process according to claim 4 wherein said coagulation bath contains aluminum sulfate and sodium chloride.

8. A process according to claim 4 wherein said kneading process is restricted to a time of about 0.2–2 minutes.

References Cited in the file of this patent
UNITED STATES PATENTS

| | | |
|---|---|---|
| 2,076,949 | Kirby | Apr. 13, 1937 |
| 2,477,338 | Kirby et al. | July 26, 1949 |